(12) United States Patent
Rosskelly et al.

(10) Patent No.: US 10,863,289 B2
(45) Date of Patent: *Dec. 8, 2020

(54) CHANGEABLE CARTRIDGE FOR HEARING DEVICE DOCKING STATIONS

(71) Applicant: Widex A/S, Lynge (DK)

(72) Inventors: Drew Rosskelly, Copenhagen K (DK); Flemming Risager, Naestved (DK); Michael Frydendal Larssen, Vekso (DK)

(73) Assignee: Widex A/S, Lynge (DK)

( * ) Notice: Subject to any disclaimer, the term of this patent is extended or adjusted under 35 U.S.C. 154(b) by 112 days.

This patent is subject to a terminal disclaimer.

(21) Appl. No.: 16/174,421

(22) Filed: Oct. 30, 2018

(65) Prior Publication Data

US 2019/0069103 A1 Feb. 28, 2019

Related U.S. Application Data

(63) Continuation of application No. 15/345,610, filed on Nov. 8, 2016, now Pat. No. 10,136,231.

(30) Foreign Application Priority Data

Nov. 9, 2015 (EP) ..................................... 15193664

(51) Int. Cl.
*H04R 25/02* (2006.01)
*H04R 25/00* (2006.01)
*H01M 2/36* (2006.01)
*H01M 8/04082* (2016.01)
*H01M 8/04291* (2016.01)

(52) U.S. Cl.
CPC .......... *H04R 25/556* (2013.01); *H01M 2/361* (2013.01); *H01M 8/04208* (2013.01); *H01M 8/04216* (2013.01); *H01M 8/04291* (2013.01); *H04R 2225/31* (2013.01); *H04R 2225/33* (2013.01)

(58) Field of Classification Search
CPC combination set(s) only.
See application file for complete search history.

(56) References Cited

U.S. PATENT DOCUMENTS 10,136,231 B2 * 11/2018 Rosskelly ............ H04R 25/556
2014/0254844 A1 * 9/2014 Shennib ................ H04R 25/65
381/323

FOREIGN PATENT DOCUMENTS

WO 2007020489 A1 2/2007

* cited by examiner

*Primary Examiner* — Amir H Etesam
(74) *Attorney, Agent, or Firm* — Sughrue Mion, PLLC

(57) ABSTRACT

A changeable cartridge for a hearing device docking station, the changeable cartridge having a flexible waste reservoir adapted to receive waste products from hearing device fuel cell power packs, and a flexible fuel reservoir adapted to hold and provide fuel to hearing device fuel cell power packs. The present invention further relates to a hearing device docking station and a hearing device docking station assembly.

15 Claims, 5 Drawing Sheets

CHANGEABLE CARTRIDGE FOR HEARING DEVICE DOCKING STATIONS

CROSS REFERENCE TO RELATED APPLICATIONS

This is a Continuation of U.S. application Ser. No. 15/345,610 filed Nov. 8, 2016, which claims priority from European Patent Application No. 15193664.8 field Nov. 9, 2015. The entire disclosure of the prior applications are hereby incorporated by reference in their entirety.

FIELD OF THE INVENTION

The present invention relates to a cartridge for a hearing device docking station. In particular, the present invention relates to a changeable airless cartridge comprising two flexible reservoirs in the form of one flexible waste bag and one flexible fuel bag.

BACKGROUND OF THE INVENTION

Hearing devices, such as hearing aids, of today are typically powered by batteries. Hearing device batteries should typically be changed every fourth or fifth day. This rather frequent change of batteries is relatively expensive. In case a rechargeable battery is being used to power a hearing device, such battery is typically to be charged every night. This charging process is a rather time consuming process. Thus, there seems to be a need for alternative power supplies for hearing devices and for handling thereof.

It may be seen as an object of embodiments of the present invention to provide changeable cartridges which in a simple manner are connectable to hearing device docking stations to which hearing device docking stations fuel cell power packs are also connectable.

It may be seen as a further object of embodiments of the present invention to provide changeable cartridges which are capable of receiving waste and/or provide fuel to hearing device fuel cell power packs via hearing device docking stations.

SUMMARY OF THE INVENTION

The above-mentioned objects are complied with by providing, in a first aspect, a changeable cartridge for a hearing device docking station, said changeable cartridge comprising
  a flexible waste reservoir being adapted to receive waste products from hearing device fuel cell power packs, and
  a flexible fuel reservoir being adapted to hold and provide fuel to hearing device fuel cell power packs.

Thus, the present invention relates to a changeable cartridge which may be connected and/or disconnected from an associated hearing device docking station. The hearing device docking station may optionally be connected to a plurality of changeable cartridges. The associated hearing device docking station may be connected to one or more hearing device fuel cell power packs so that waste may flow from a power pack to a changeable cartridge. Similarly, fuel may flow from a changeable cartridge to a power pack, or even a plurality of power packs.

It is advantageous that hearing device fuel cell power packs may be refilled with fuel relatively quickly. Each refill may typically be completed within one minute.

The changeable cartridge may further comprise a protective cover at least partly encapsulating, and thereby protecting, the flexible waste and fuel reservoirs. Moreover, a pressure release arrangement for pressure equalization between the interior of the protective cover and the surroundings may be provided as well. The pressure release arrangement may comprise a membrane which may be secured to or forming part of the protective cover.

In order to be able to receive waste products and provide fuel the changeable cartridge may further comprise an inlet valve and an outlet valve. The inlet valve may be connected to the flexible waste reservoir, whereas the outlet valve may be connected to the flexible fuel reservoir. Preferably, the inlet and outlet valves comprise drip free valves.

The flexible waste and fuel reservoirs may each comprise a polyethylene bag, such as a high density polyethylene bag. The flexibility of the reservoirs is advantageous in that it increases the utilization of the changeable cartridge. The reason for this being that the changeable cartridge may be operated as an airless system.

The flexible waste and fuel reservoirs may each have a volume of at least 100 milliliters. This may ensure that the changeable cartridge has sufficient capacity for completing a plurality of fuel refills of hearing device fuel cell power packs.

In a second aspect the present invention relates to a hearing device docking station comprising
  a first connector arrangement for connecting the docking station to at least one changeable cartridge according to the first aspect, and
  a second connector arrangement for connecting the docking station to at least one hearing device fuel cell power pack.

The hearing device fuel cell power pack may be a miniature power pack being compatible with modern hearing devices, including hearing aids. Such hearing aids may be of the following types: behind-the-ear, in-the-ear, in-the-canal, invisible-in-canal and completely-in-canal.

In a third aspect the present invention relates to a hearing device docking station assembly comprising
  at least one changeable cartridge according to the first aspect,
  a hearing device docking station according to the second aspect, and
  a hearing device fuel cell power pack.

Again, the hearing device fuel cell power pack may be a miniature power pack being compatible with modern hearing devices, including hearing aids of the types mentioned above.

BRIEF DESCRIPTION OF THE DRAWINGS

The present invention will now be described in further detail with reference to the accompanying figures, wherein.

Figure 1:
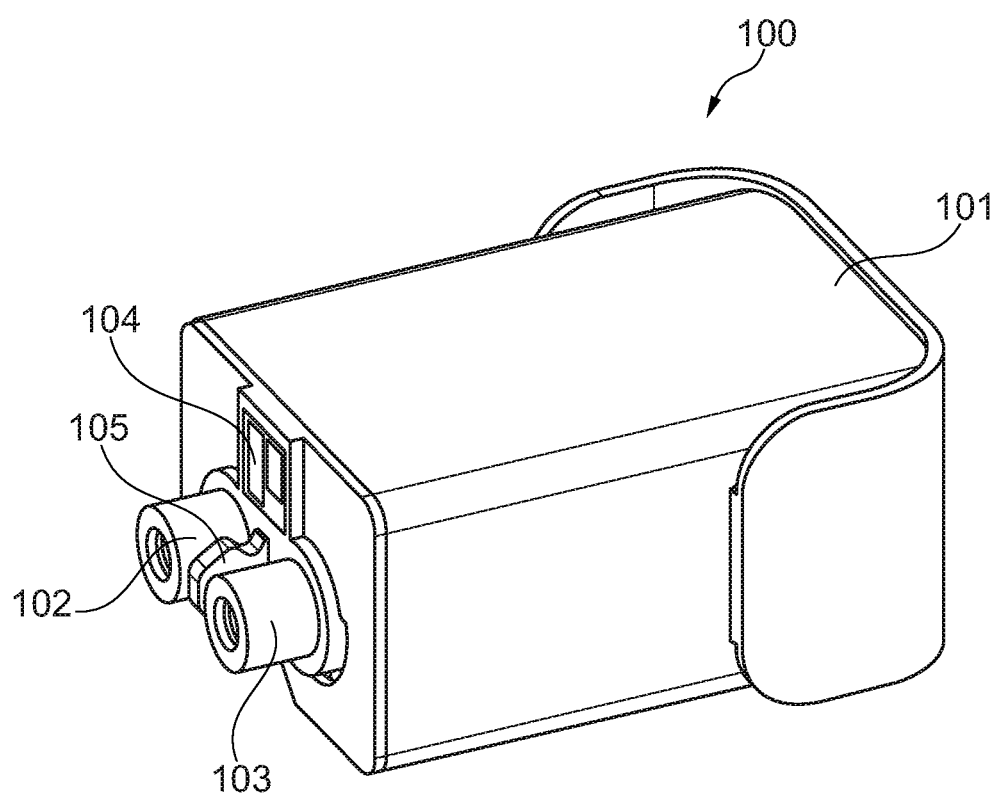
FIG. 1 shows a cartridge including a protective cover.

While the invention is susceptible to various modifications and alternative forms, specific embodiments have been shown by way of examples in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

In its most general aspect the present invention relates to a changeable cartridge comprising a flexible waste reservoir and a flexible fuel reservoir. The changeable cartridge of the present invention is adapted to be connected to a hearing device docking station so that hearing device fuel cell power packs may be emptied and/or refilled when being connected to the hearing device docking station as well. The hearing device fuel cell power packs are emptied and/or refilled essentially without introducing air into the system, i.e. into the hearing device fuel cell power packs and/or into the changeable cartridge. The changeable cartridge will have a capacity that facilitates that hearing device fuel cell power packs may be emptied and/or refilled several times.

Referring now to FIG. 1 a changeable cartridge 100 according to the present invention is depicted. As seen the cartridge comprises a protective cover 101, a waste inlet valve 102, a fuel outlet valve 103 and a unique identifier 104. Preferably, the valves 102, 103 are so-called drip free valves including a silicone membrane, cf. FIG. 3.

The unique identifier 104 is adapted to communicate with suitable electronics of the hearing device docking station. This suitable electronics may include a memory for memorising for example a partly emptied/filled changeable cartridge. Not only the identification code but also the remaining waste and/or fuel capacity is stored in the hearing device docking station. If a partly emptied/filled cartridge has been temporarily disconnected from the hearing device docking station, and is then reconnected to the hearing device docking station, the partly emptied/filled cartridge is recognised via its unique identifier 104. Mechanical retaining means 105 for mechanically connecting the changeable cartridge 100 to the hearing device docking station is provided as well.

Figure 2:
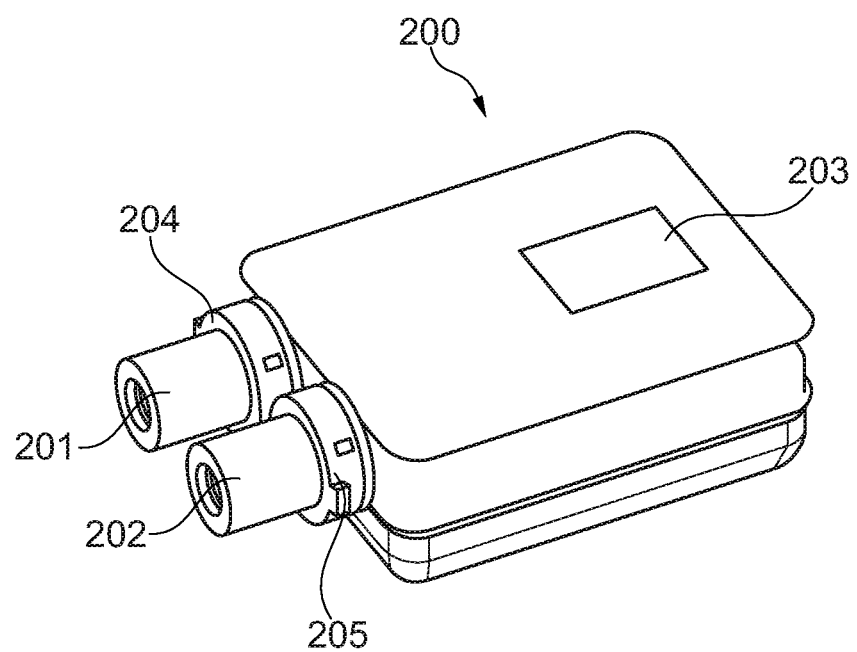
FIG. 2 shows a cartridge without a protective cover.

Referring now to FIG. 2 a changeable cartridge 200 without a protective cover is depicted. As seen the cartridge comprises a waste inlet valve 201, a fuel outlet valve 202 and a pressure release arrangement 203. Again, the valves 201, 202 are preferably drip free valves. The pressure release arrangement 203 may be implemented in the form of a membrane that secures pressure equalization between the inside and the outside of the changeable cartridge. This pressure equalization ensures maximum utilization of the flexible waste reservoir and the flexible fuel reservoir inside the changeable cartridge. Mechanical retaining means 204, 205 for engaging with the protective cover (not shown) are provided on both valves 201, 202, respectively.

Figure 3:
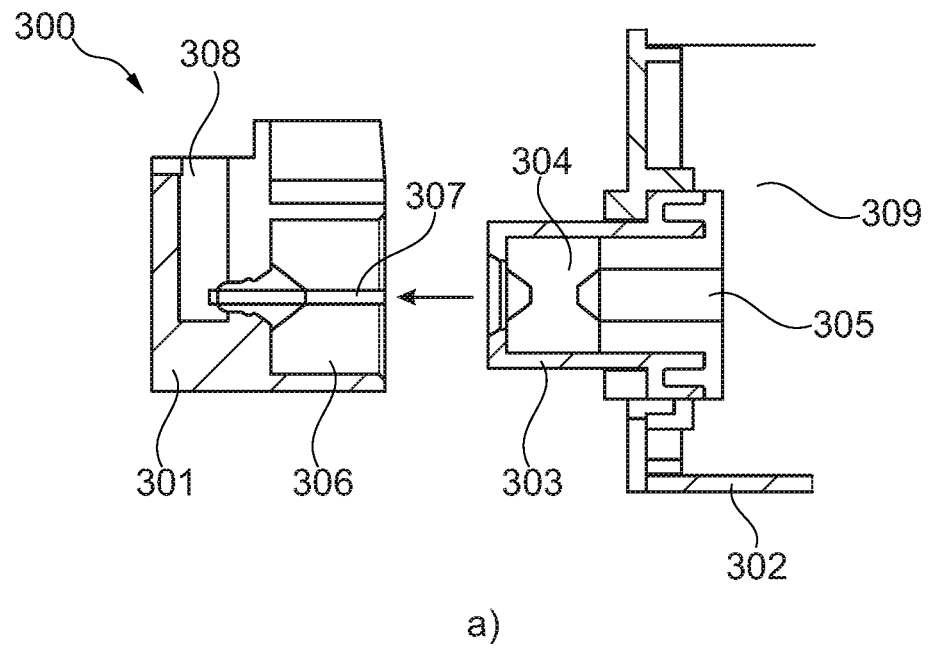
FIG. 3 illustrates how the cartridge is connected to the docking station.
Figure 3:
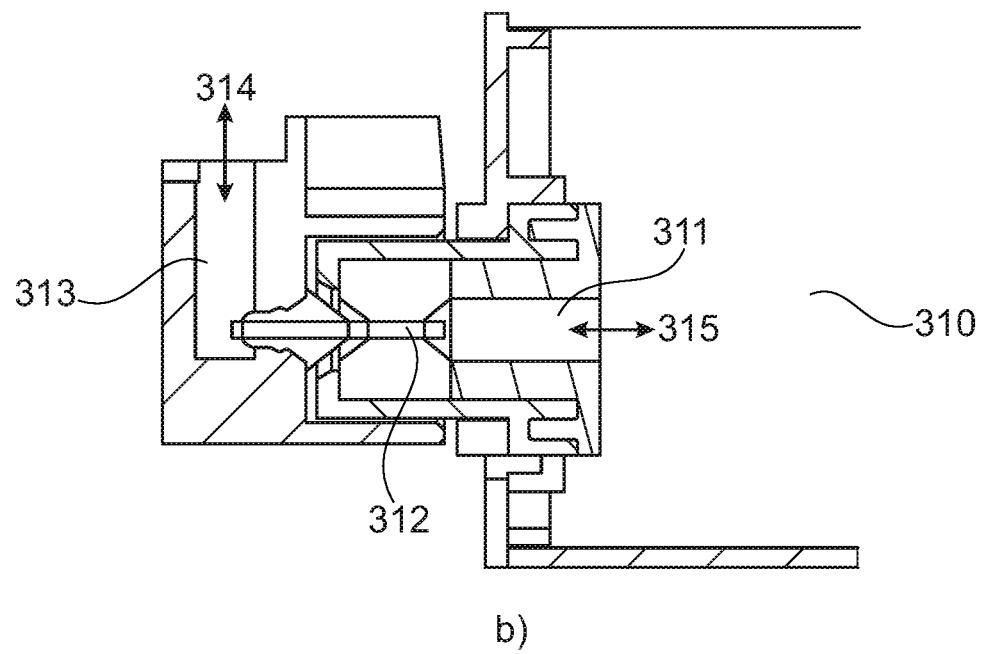

FIG. 3 shows cross-sectional views 300 of a cartridge valve 303 and a corresponding connector 301 on a hearing device docking station. In FIG. 3a the valve and connector are separated, whereas in FIG. 3b the valve and connector are engaged.

Referring now to FIG. 3a the changeable cartridge 302 comprises a drip free valve 303 being at least partly filled with a silicone membrane 304. In case the reservoir 309 of the cartridge 302 contains fuel, this fuel enters the valve 303 via the passage 305. The connector 301 on the hearing device docking station comprises an opening 306 for receiving the valve 303 when the valve 303 and the connector 301 are brought together, cf. FIG. 3b. The needle 307 is adapted to penetrate the silicone membrane 304 of the valve 303 so that a connection is established between the passage 308 and the fuel reservoir 309 of the changeable cartridge. It should be noted that the reservoir 309 can be a waste reservoir whereby the flow direction is inverted.

In FIG. 3b the changeable cartridge has been positioned in the hearing device docking station so that fuel may be pumped out of the cartridge reservoir 310 via the passage 311, the needle 312 and the passage 313. It should be noted however, that in case the cartridge reservoir 310 is a waste reservoir the flow may be reversed as indicated by the two arrows 314, 315.

Figure 4:
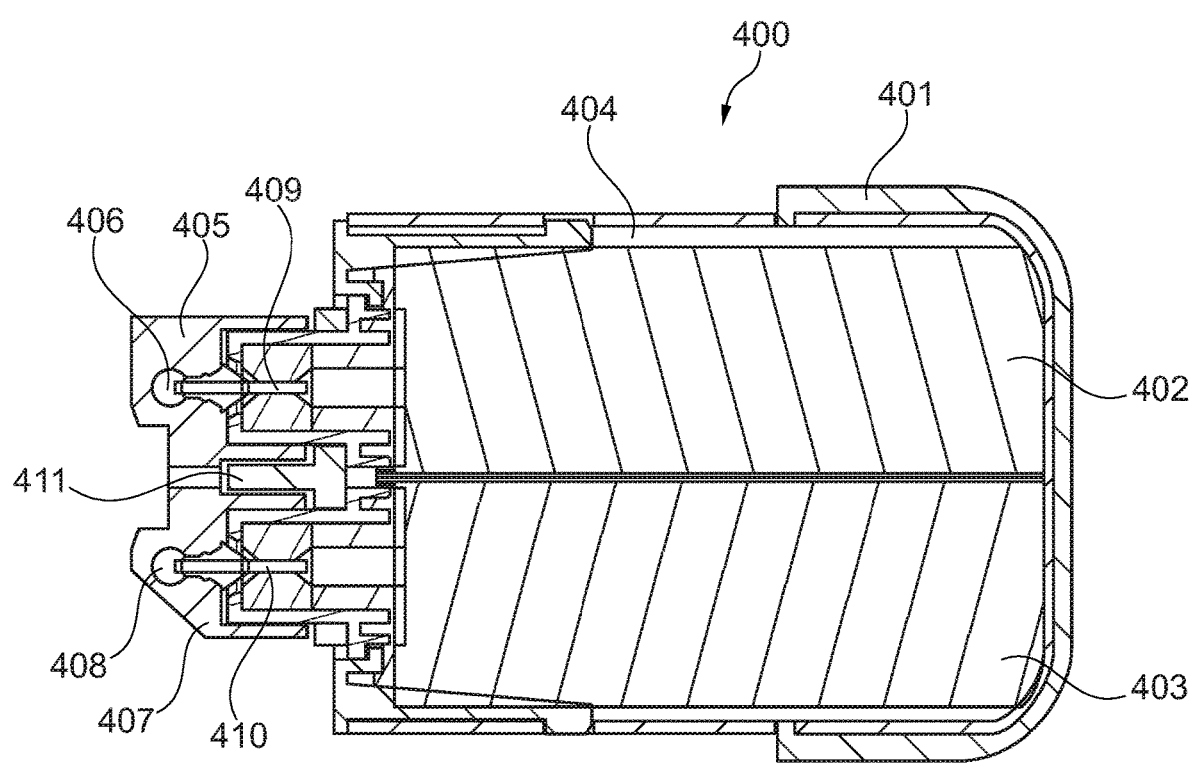
FIG. 4 shows a cross-sectional view of a cartridge connected to a docking station.

Referring now to FIG. 4 a cross-sectional view of a changeable cartridge 400 is depicted. As previously addressed, the cartridge 400 is adapted to be connected to a hearing device docking station to which docking station hearing device fuel cell power packs are also connected for fuel refill and/or removal of waste. The fuel applied in hearing device power packs is typically methanol. The changeable cartridge 400 of the present invention comprises a protective cover 401 which encapsulates a waste reservoir 402 and a fuel reservoir 403. The capacity of each of these reservoirs is at least 100 milliliters. Both reservoirs 402, 403 are implemented as flexible bags of a polymer material, such as polyethylene. The polymer material forming the flexible bags 402, 403 should be capable of withstanding methanol without dissolving for a predetermined period of time, such as at least 18 months.

A pressure releasing membrane 404 is provided in the protective cover 401 in order to ensure pressure equalization between the inside and the outside of the protective cover 401. In this manner maximum exploitation of the flexible bags 402, 403 are ensured.

Changeable cartridges according to the present come initially with an empty flexible waste bag 402, and a full flexible fuel bag 403. The waste bag 402 is adapted to receive remains of fuel, water and other waste material when a hearing device fuel cell power pack is connected to a hearing device docking station for refill. Waste is provided to the waste bag 402 via the waste passage 406 and the needle 409. Fuel is provided to a fuel cell power pack via the needle 410 and the fuel passage 408. The passages 406, 408 are provided in the connectors 405, 407 of the docking station, respectively.

The capacity of the flexible fuel bag 403 is sufficient to refill a hearing device fuel cell power pack several times, such as perhaps 30 times. Each refill takes less than one minute.

A mechanical locking mechanism 411 locks the changeable cartridge 400 to the hearing device docking station via a user friendly tactile arrangement.

Figure 5:
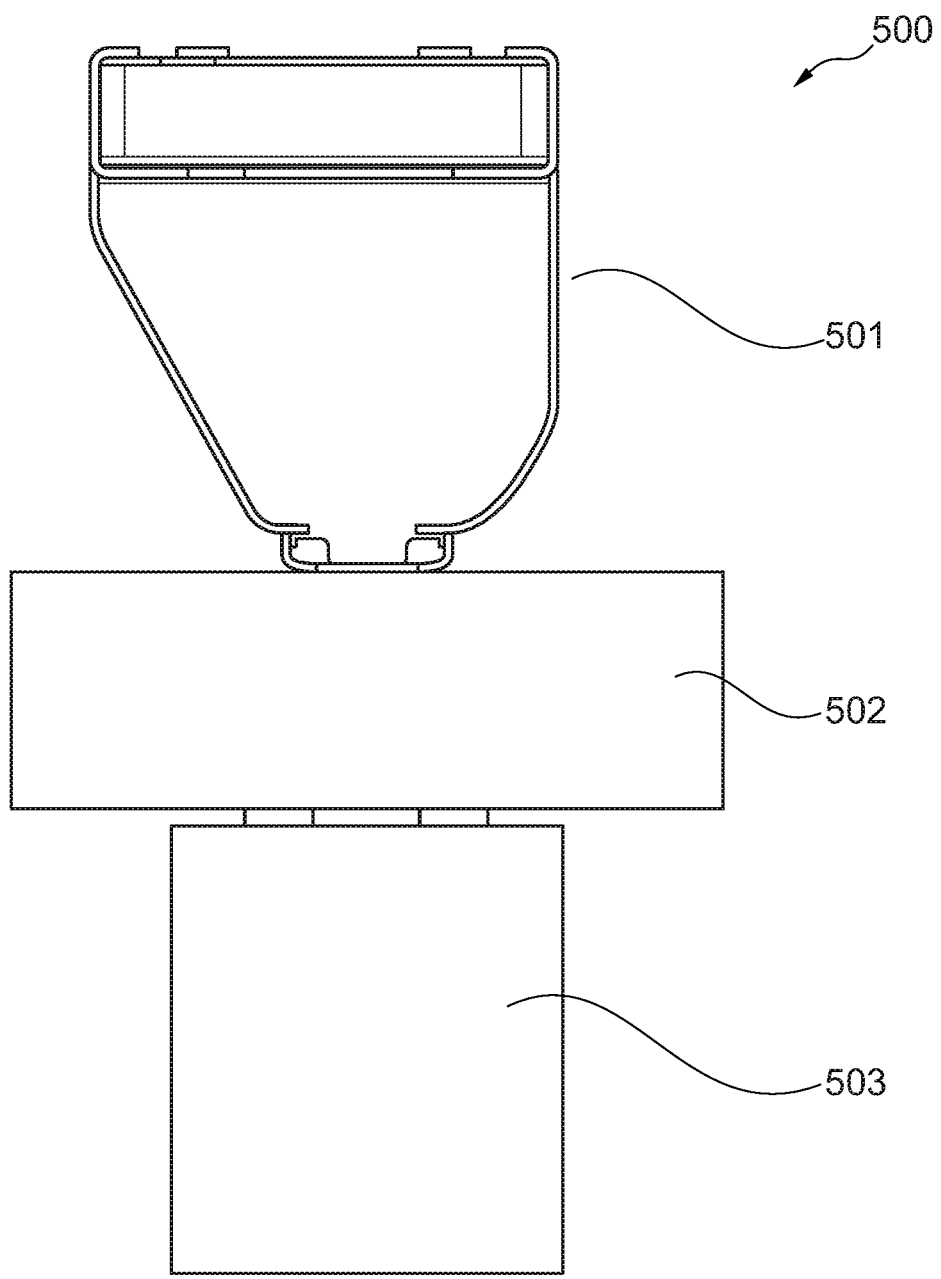
FIG. 5 shows a hearing device fuel cell power pack and a cartridge being connected to a hearing device docking station.

FIG. 5 shows an assembly 500 comprising a hearing device fuel cell power pack 501 and a cartridge 503 being connected to a hearing device docking station 502. The hearing device docking station 502 forms a connection between the hearing device fuel cell power pack 501 and the cartridge 503 so that fluids may be exchanged there between. The hearing device fuel cell power pack 501 may be connected to the hearing device docking station 502 via a connector assembly comprising a male and a female part, where the male part is fastened to or integrated with the hearing device docking station 502, whereas the female part is fastened to or integrated with the hearing device fuel cell power pack 501. The cartridge 503 may be connected to the hearing device docking station 502 via a more conventional connector. It should be noted that a plurality of hearing device fuel cell power packs 501 as well as a plurality of cartridges 503 may be connected to the same hearing device docking station 502.

The invention claimed is:

1. A changeable cartridge for a hearing device docking station, said changeable cartridge comprising
   a flexible waste reservoir adapted to receive waste products from hearing device fuel cell power packs, and
   a flexible fuel reservoir adapted to hold and provide fuel to hearing device fuel cell power packs,
thereby enabling the changeable cartridge to operate as an airless system,
wherein said flexible waste reservoir and flexible fuel reservoir are disposed adjacent one another in such a manner that as a volume of one of said reservoirs increases and a volume of the other of said reservoirs decreases, the increased volume of said one reservoir will at least partially occupy space formerly occupied by the other reservoir before the volume of said other reservoir decreased.

2. A changeable cartridge according to claim 1, further comprising a protective cover at least partly encapsulating the flexible waste and fuel reservoirs.

3. A changeable cartridge according to claim 2, further comprising a pressure release arrangement for pressure equalization between the interior of the protective cover and the surroundings.

4. A changeable cartridge according to claim 3, wherein the pressure release arrangement comprises a membrane, the pressure release arrangement being secured to or forming part of the protective cover.

5. A changeable cartridge according to claim 1, further comprising an inlet valve and an outlet valve, wherein the inlet valve is connected to the flexible waste reservoir, and wherein the outlet valve is connected to the flexible fuel reservoir.

6. A changeable cartridge according to claim 5, wherein the inlet and outlet valves comprise drip free valves.

7. A changeable cartridge according to claim 1, wherein the flexible waste and fuel reservoirs each comprises a high density polyethylene bag.

8. A changeable cartridge according to claim 1, wherein the flexible waste and fuel reservoirs each has a volume of at least 100 milliliters.

9. A hearing device docking station comprising
   a first connector arrangement for connecting the docking station to at least one changeable cartridge according to claim 1, and
   a second connector arrangement for connecting the docking station to at least one hearing device fuel cell power pack.

10. A hearing device docking station assembly comprising
    at least one changeable cartridge according to claim 1,
    a hearing device docking station comprising a first connector arrangement for connecting the docking station to said cartridge, and a second connector arrangement for connecting the docking station to at least one hearing device fuel cell power pack, and
    a hearing device fuel cell power pack.

11. A changeable cartridge according to claim 1, wherein said cartridge includes a unique identifier by which a docking station can uniquely identify said cartridge.

12. A docking station according to claim 9, wherein said docking station is configured to uniquely identify said cartridge and to store information about said uniquely identified cartridge, and to retain said information when said cartridge is disconnected from said docking station.

13. A changeable cartridge according to claim 1, wherein each said reservoir comprises a bag having an interior surface the entirety of which comprises flexible polyethylene.

14. A changeable cartridge for a hearing device docking station, said changeable cartridge comprising
    a flexible waste reservoir adapted to receive waste products from hearing device fuel cell power packs, and
    a flexible fuel reservoir adapted to hold and provide fuel to hearing device fuel cell power packs,
thereby enabling the changeable cartridge to operate as an airless system,
wherein said cartridge includes a unique identifier by which a docking station can uniquely identify said cartridge.

15. A docking station according to claim 14, wherein said docking station is configured to uniquely identify said cartridge and to store information about said uniquely identified cartridge, and to retain said information when said cartridge is disconnected from said docking station.

* * * * *